United States Patent
Rowe

(10) Patent No.: US 7,454,363 B1
(45) Date of Patent: Nov. 18, 2008

(54) METHOD AND APPARATUS FOR VOUCHER SORTING AND RECONCILIATION IN SOFT COUNT PROCESS

(75) Inventor: Richard Rowe, Reno, NV (US)

(73) Assignee: IGT, Reno, NV (US)

( * ) Notice: Subject to any disclaimer, the term of this patent is extended or adjusted under 35 U.S.C. 154(b) by 1199 days.

(21) Appl. No.: 09/631,855

(22) Filed: Aug. 3, 2000

(51) Int. Cl.
G06Q 30/00 (2006.01)
G07G 1/14 (2006.01)

(52) U.S. Cl. .............................. 705/14; 463/29; 463/42
(58) Field of Classification Search ...................... 705/1, 705/10, 14; 463/29, 42
See application file for complete search history.

(56) References Cited

U.S. PATENT DOCUMENTS

| | | | |
|---|---|---|---|
| 3,124,674 A | 3/1964 | Edwards et al. |
| 3,327,292 A | 6/1967 | Eriksson et al. |
| 3,487,905 A | 1/1970 | James, Sr. et al. |
| 3,560,715 A | 2/1971 | Osaka |
| 3,634,656 A | 1/1972 | Krechmer et al. |
| 3,778,595 A | 12/1973 | Hatanaka et al. |
| 3,786,234 A | 1/1974 | Trent et al. |
| 3,810,627 A | 5/1974 | Levy |
| 3,874,584 A | 4/1975 | Foley |
| 3,906,447 A | 9/1975 | Crafton |
| 3,909,002 A | 9/1975 | Levy |
| 3,958,103 A | 5/1976 | Oka et al. |
| 3,984,660 A | 10/1976 | Oka et al. |
| 4,032,946 A | 6/1977 | Wakatsuki et al. |
| 4,033,588 A | 7/1977 | Watts |
| 4,068,213 A | 1/1978 | Nakamura et al. |
| 4,072,930 A | 2/1978 | Lucero et al. |
| 4,108,361 A | 8/1978 | Krause |
| 4,108,364 A | 8/1978 | Tanaka et al. |
| 4,114,027 A | 9/1978 | Slater et al. |

(Continued)

FOREIGN PATENT DOCUMENTS

AU 555905 10/1986

(Continued)

OTHER PUBLICATIONS

Rowe, "An Award Ticket Central Clearinhouse", Apr. 28, 2000, U.S. Appl. No. 60/200,329, also available via USPTO's IFW system.*

(Continued)

*Primary Examiner*—Arthur Duran
(74) *Attorney, Agent, or Firm*—Weaver Austin Villeneuve & Sampson LLP.

(57) ABSTRACT

A method and apparatus for sorting and reconciling vouchers accepted by a gaming machine or other device is disclosed. The gaming machine is configured to generate information relating to each accepted voucher, or provide such information to a remote location. At least one apparatus is adapted to sort bill monies from vouchers retrieved from the cash box of a gaming machine. The same or another apparatus is adapted to read each voucher to determine its identity and value. At least one device, such as a computer including appropriate hardware and software, is configured to determine if the value and identity of the processed vouchers reconcile with the value and identity of the vouchers having been identified as paid by the gaming machine. In this manner, a "soft count" process is performed on a group of intermingled bill monies and vouchers retrieved from a gaming machine.

24 Claims, 3 Drawing Sheets

U.S. PATENT DOCUMENTS

| | | | |
|---|---|---|---|
| 4,124,109 A | 11/1978 | Bissell et al. | |
| 4,157,829 A | 6/1979 | Goldman et al. | |
| 4,206,920 A | 6/1980 | Weatherford et al. | |
| 4,240,635 A | 12/1980 | Brown | |
| 4,254,404 A | 3/1981 | White | |
| 4,275,456 A | 6/1981 | Tanaka et al. | |
| 4,283,709 A | 8/1981 | Lucero et al. | |
| 4,318,354 A | 3/1982 | Fish | |
| 4,322,612 A | 3/1982 | Lange | |
| 4,323,770 A | 4/1982 | Dieulot et al. | |
| 4,335,809 A | 6/1982 | Wain | |
| 4,339,798 A | 7/1982 | Hedges et al. | |
| 4,373,726 A | 2/1983 | Churchill et al. | |
| 4,448,419 A | 5/1984 | Telnaes | 463/21 |
| 4,467,424 A | 8/1984 | Hedges et al. | |
| 4,494,197 A | 1/1985 | Troy et al. | |
| 4,517,558 A | 5/1985 | Davids | |
| 4,527,798 A | 7/1985 | Siekierski et al. | |
| 4,531,187 A | 7/1985 | Uhland | |
| 4,575,622 A | 3/1986 | Pellegrini | |
| 4,626,672 A | 12/1986 | Sapitowicz et al. | |
| 4,636,951 A | 1/1987 | Harlick | |
| 4,648,600 A | 3/1987 | Olliges | |
| 4,650,977 A | 3/1987 | Couch | |
| 4,669,596 A | 6/1987 | Capers et al. | |
| 4,669,730 A | 6/1987 | Small | |
| 4,675,515 A | 6/1987 | Lucero | |
| 4,689,742 A | 8/1987 | Troy et al. | |
| 4,689,757 A | 8/1987 | Downing et al. | |
| 4,700,296 A | 10/1987 | Palmer, Jr. et al. | |
| 4,727,544 A | 2/1988 | Brunner et al. | |
| 4,760,527 A | 7/1988 | Sidley | |
| 4,764,666 A | 8/1988 | Bergeron | 463/25 |
| 4,775,937 A | 10/1988 | Bell | |
| 4,782,468 A | 11/1988 | Jones et al. | |
| 4,788,419 A | 11/1988 | Walters et al. | |
| 4,809,837 A | 3/1989 | Hayashi | |
| 4,815,741 A | 3/1989 | Small | |
| 4,832,341 A | 5/1989 | Muller et al. | |
| 4,856,787 A | 8/1989 | Itkis | |
| 4,875,164 A | 10/1989 | Monfort | |
| 4,880,237 A | 11/1989 | Kishishita | |
| 4,882,473 A | 11/1989 | Bergeron et al. | |
| 4,884,212 A | 11/1989 | Stutsman | |
| 4,889,339 A | 12/1989 | Okada | |
| 4,926,327 A | 5/1990 | Sidley | |
| 4,937,853 A | 6/1990 | Brule et al. | |
| 4,963,722 A | 10/1990 | Takeuchi | |
| 5,007,641 A | 4/1991 | Seidman | |
| 5,007,649 A | 4/1991 | Richardson | |
| 5,016,880 A | 5/1991 | Berge | |
| 5,025,139 A | 6/1991 | Halliburton, Jr. | |
| 5,038,022 A | 8/1991 | Lucero | |
| 5,039,848 A | 8/1991 | Stoken | |
| 5,042,809 A | 8/1991 | Richardson | |
| 5,080,364 A | 1/1992 | Seidman | 463/17 |
| 5,083,271 A | 1/1992 | Thacher et al. | |
| 5,096,195 A | 3/1992 | Gammon | |
| 5,113,900 A | 5/1992 | Gilbert | |
| 5,113,990 A | 5/1992 | Gabrius et al. | |
| 5,119,295 A | 6/1992 | Kapur | |
| 5,129,652 A | 7/1992 | Wilkinson | 279/139 |
| 5,135,224 A | 8/1992 | Yamamoto et al. | |
| 5,159,549 A | 10/1992 | Hallman, Jr. et al. | |
| 5,179,517 A | 1/1993 | Sarbin et al. | |
| 5,192,854 A | 3/1993 | Counts | |
| 5,197,094 A | 3/1993 | Tillery et al. | |
| 5,222,583 A | 6/1993 | Bergmann et al. | |
| 5,223,698 A | 6/1993 | Kapur | |
| 5,227,424 A | 7/1993 | Tokieda et al. | |
| 5,265,874 A | 11/1993 | Dickinson et al. | 463/25 |
| 5,287,269 A | 2/1994 | Dorrough et al. | |
| 5,290,033 A | 3/1994 | Bittner et al. | 463/25 |
| 5,297,802 A | 3/1994 | Pocock et al. | |
| 5,317,135 A | 5/1994 | Finocchio | |
| 5,321,241 A | 6/1994 | Craine | |
| 5,324,035 A | 6/1994 | Morris et al. | |
| 5,326,104 A | 7/1994 | Pease et al. | 463/18 |
| 5,332,076 A | 7/1994 | Ziegert | |
| 5,342,047 A | 8/1994 | Heidel et al. | |
| 5,348,299 A | 9/1994 | Clapper, Jr. | |
| 5,371,345 A | 12/1994 | LeStrange et al. | |
| 5,373,440 A | 12/1994 | Cohen et al. | |
| 5,409,092 A | 4/1995 | Itako et al. | |
| 5,412,189 A | 5/1995 | Cragun | |
| 5,429,361 A | 7/1995 | Raven et al. | 463/25 |
| 5,440,108 A | 8/1995 | Tran et al. | |
| 5,457,306 A | 10/1995 | Lucero | |
| 5,470,079 A * | 11/1995 | LeStrange et al. | 463/25 |
| 5,475,205 A | 12/1995 | Behm et al. | |
| 5,491,326 A | 2/1996 | Marceau et al. | |
| 5,507,491 A | 4/1996 | Gatto et al. | |
| 5,536,008 A | 7/1996 | Clapper, Jr. | |
| 5,551,692 A | 9/1996 | Pettit et al. | |
| 5,557,086 A | 9/1996 | Schulze et al. | 235/380 |
| 5,559,312 A | 9/1996 | Lucero | |
| 5,564,546 A * | 10/1996 | Molbak et al. | 194/216 |
| 5,580,310 A | 12/1996 | Orus et al. | |
| 5,580,311 A | 12/1996 | Haste, III | |
| 5,609,337 A | 3/1997 | Clapper, Jr. | |
| 5,613,680 A | 3/1997 | Groves et al. | |
| 5,618,045 A | 4/1997 | Kagan et al. | 463/40 |
| 5,620,079 A * | 4/1997 | Molbak | 194/217 |
| 5,625,562 A | 4/1997 | Veeneman et al. | |
| 5,627,356 A | 5/1997 | Takemoto et al. | |
| 5,628,684 A | 5/1997 | Bouedec | |
| 5,643,086 A | 7/1997 | Alcorn et al. | 463/29 |
| 5,645,485 A | 7/1997 | Clapper, Jr. | |
| 5,650,761 A | 7/1997 | Gomm et al. | |
| 5,655,961 A | 8/1997 | Acres et al. | |
| 5,655,966 A | 8/1997 | Werdin, Jr. et al. | |
| 5,674,128 A | 10/1997 | Holch et al. | |
| 5,678,886 A | 10/1997 | Infanti | 297/217.3 |
| 5,694,323 A * | 12/1997 | Koropitzer et al. | 364/464.1 |
| 5,735,432 A | 4/1998 | Stoken et al. | |
| 5,737,418 A | 4/1998 | Saffari et al. | |
| 5,738,583 A | 4/1998 | Comas et al. | 463/40 |
| 5,741,183 A | 4/1998 | Acres et al. | 463/42 |
| 5,749,784 A | 5/1998 | Clapper, Jr. | |
| 5,752,882 A | 5/1998 | Acres et al. | |
| 5,753,899 A | 5/1998 | Gomm et al. | |
| 5,759,103 A * | 6/1998 | Freels et al. | 463/42 |
| 5,761,647 A * | 6/1998 | Boushy | 705/10 |
| 5,762,552 A | 6/1998 | Vuong et al. | 463/25 |
| 5,768,382 A | 6/1998 | Schneier et al. | 380/23 |
| 5,770,533 A | 6/1998 | Franchi | 463/42 |
| 5,779,545 A | 7/1998 | Berg et al. | 463/22 |
| 5,779,549 A | 7/1998 | Walker et al. | 463/42 |
| 5,795,228 A | 8/1998 | Trumbull et al. | 463/42 |
| 5,797,085 A | 8/1998 | Beuk et al. | 455/88 |
| 5,800,269 A * | 9/1998 | Holch et al. | 463/42 |
| 5,810,664 A | 9/1998 | Clapper, Jr. | |
| 5,811,772 A | 9/1998 | Lucero | |
| 5,816,918 A | 10/1998 | Kelly et al. | |
| 5,820,459 A | 10/1998 | Acres et al. | |
| 5,839,956 A | 11/1998 | Takemoto | |
| 5,869,826 A | 2/1999 | Eleftheriou | |
| 5,871,398 A | 2/1999 | Schneier et al. | 463/16 |
| 5,884,292 A * | 3/1999 | Baker et al. | 705/403 |
| 5,902,983 A | 5/1999 | Crevelt et al. | |
| 5,919,091 A | 7/1999 | Bell et al. | |
| 5,923,735 A | 7/1999 | Swartz et al. | |
| 5,928,082 A * | 7/1999 | Clapper, Jr. | 463/16 |
| 5,949,042 A | 9/1999 | Dietz, II et al. | |

| | | | |
|---|---|---|---|
| 5,951,397 A | 9/1999 | Dickinson | |
| 5,952,640 A | 9/1999 | Lucero | |
| 5,954,583 A | 9/1999 | Green | |
| 5,959,277 A | 9/1999 | Lucero | |
| 5,967,896 A | 10/1999 | Jorasch et al. | 463/25 |
| 5,984,779 A | 11/1999 | Bridgeman et al. | |
| 5,999,808 A | 12/1999 | LaDue | 700/91 |
| 6,001,016 A | 12/1999 | Walker et al. | 463/42 |
| 6,012,832 A | 1/2000 | Saunders et al. | 364/410 |
| 6,012,983 A | 1/2000 | Walker et al. | 463/20 |
| 6,019,283 A | 2/2000 | Lucero | 235/380 |
| 6,048,269 A | 4/2000 | Burns et al. | 463/25 |
| 6,089,982 A | 7/2000 | Holch et al. | |
| 6,093,100 A | 7/2000 | Singer et al. | 463/13 |
| 6,104,815 A | 8/2000 | Alcorn et al. | 380/251 |
| 6,110,041 A | 8/2000 | Walker et al. | 463/20 |
| 6,110,044 A | 8/2000 | Stern | 463/29 |
| 6,113,098 A | 9/2000 | Adams | 273/143 R |
| 6,116,402 A | 9/2000 | Beach et al. | |
| 6,149,522 A | 11/2000 | Alcorn et al. | 463/29 |
| 6,165,072 A | 12/2000 | Davis et al. | 463/29 |
| 6,208,978 B1 * | 3/2001 | Walker et al. | 705/38 |
| 6,227,972 B1 | 5/2001 | Walker et al. | 463/42 |
| 6,251,017 B1 * | 6/2001 | Leason et al. | 463/42 |
| 6,254,006 B1 | 7/2001 | Mish | 235/492 |
| 6,270,410 B1 | 8/2001 | DeMar et al. | 463/20 |
| 6,280,326 B1 | 8/2001 | Saunders | 463/25 |
| 6,280,328 B1 | 8/2001 | Holch et al. | |
| 6,285,868 B1 | 9/2001 | LaDue | 455/410 |
| 6,340,331 B1 | 1/2002 | Saunders et al. | 463/25 |
| 6,368,219 B1 | 4/2002 | Szrek et al. | 463/42 |
| 6,394,907 B1 * | 5/2002 | Rowe | 463/42 |
| 6,443,642 B1 | 9/2002 | Luciano et al. | 400/88 |
| 6,498,655 B1 * | 12/2002 | Brooks et al. | 358/1.12 |
| 6,500,067 B1 * | 12/2002 | Luciano et al. | 463/25 |
| 6,508,709 B1 | 1/2003 | Karmarkar | 463/43 |
| 6,511,377 B1 | 1/2003 | Weiss | 463/25 |
| 6,537,150 B1 * | 3/2003 | Luciano et al. | 463/16 |
| 6,547,664 B2 | 4/2003 | Saunders | 463/25 |
| 6,623,357 B2 * | 9/2003 | Chowdhury | 463/25 |
| 6,645,075 B1 * | 11/2003 | Gatto et al. | 463/25 |
| 6,652,380 B1 * | 11/2003 | Luciano | 463/25 |
| 6,679,775 B1 * | 1/2004 | Luciano et al. | 463/25 |
| 6,682,421 B1 * | 1/2004 | Rowe et al. | 463/25 |
| 6,685,559 B2 * | 2/2004 | Luciano et al. | 463/16 |
| 6,729,957 B2 | 5/2004 | Burns et al. | |
| 6,729,958 B2 | 5/2004 | Burns et al. | |
| 6,736,725 B2 | 5/2004 | Burns et al. | |
| 2001/0034259 A1 * | 10/2001 | Luciano et al. | 463/16 |

FOREIGN PATENT DOCUMENTS

| | | |
|---|---|---|
| CA | 2008874 | 7/1990 |
| CA | 2026269 | 6/1991 |
| DE | 3406058 | 8/1985 |
| DE | 3441518 A1 | 5/1986 |
| DE | 19502613 A1 | 1/1995 |
| DE | 4422370 A1 | 1/1996 |
| EP | 0 051 579 A1 | 10/1981 |
| EP | 0 150 103 A2 | 1/1985 |
| EP | 0 208 857 A1 | 1/1987 |
| EP | 0 555 565 A1 | 2/1992 |
| EP | 0534718 A2 | 3/1993 |
| EP | 0 261 222 B1 | 8/1994 |
| EP | 0805424 A2 | 11/1997 |
| EP | 1094425 A2 | 4/2001 |
| EP | 1139310 A2 | 10/2001 |
| GB | 1 391 060 | 4/1975 |
| GB | 1 558 521 | 1/1980 |
| GB | 2 208 737 A | 4/1989 |
| GB | 2 241 098 A | 8/1991 |
| GB | 2 241 098 A | 8/1991 |
| GB | 2 296 361 A | 6/1996 |
| GB | 2 374 191 A | 10/2002 |
| JP | 63-502702 | 10/1988 |
| JP | 64-64681 | 3/1989 |
| JP | 1-277588 | 11/1989 |
| JP | 3-242179 | 10/1991 |
| JP | 4-51982 | 2/1992 |
| JP | 4-53580 | 2/1992 |
| JP | 4-174693 | 6/1992 |
| JP | 4-189314 | 7/1992 |
| JP | 4-189384 | 7/1992 |
| JP | 4-338477 | 11/1992 |
| JP | 4-373097 | 12/1992 |
| JP | 5-184724 | 7/1993 |
| WO | 8101664 | 6/1981 |
| WO | 87/05425 | 9/1987 |
| WO | 92/20415 | 11/1992 |
| WO | WO 94/16781 | 8/1994 |
| WO | WO 95/24689 | 9/1995 |
| WO | WO 96/00950 | 1/1996 |
| WO | 98/16910 | 4/1998 |
| WO | WO01/76710 A2 | 10/2001 |
| WO | WO01/84516 A2 | 11/2001 |
| WO | WO02/23491 A2 | 3/2002 |
| WO | WO02/23496 A2 | 3/2002 |
| WO | WO02/41963 A2 | 5/2002 |

OTHER PUBLICATIONS

U.S. Appl. No. 09/544,884, filed Apr. 7, 2000, Rowe et al.
Schneier B., "Applied Cryptography, Second Edition", 1996, Applied Cryptography. Protocols, Algorithms, and Source Code in C, pp. 31-38, 50-51, XP002248999, ISBN: 0-471-11709-9.
Berry, Kathleen M. "Hardware Makers Cash In On America's Betting Mania," The new York Times, Sep. 16, 1990, p. F-4.
Boyd, C. "Modern Data Encryption," Electronics and Communication Engineering Journal, Oct. 1993, pp. 271-278.
Complaint of Aristocrat Technologies, et al. dated Jan. 22, 2002.
Declaration of Jeffrey Lindo dated Jul. 2000 and filed in Patent Office in connection with U.S. patent No. 4,575,622.
Denis, A. and Kinsner, W. "Secure and Resilient Data Printed on Paper," Department of Electrical and Computer Engineering, University of Manitoba, Winnipeg, Manitoba, Canada, 1999, pp. 245-248.
Griffin, Jeffrey A. "Privacy and Security in the Digital Age," Computer Information Systems and Technology, Purdue University, 1998, pp. 135-137.
"Kenilworth Systems Corporation," Barron's, Aug. 4, 1980.
"New Brunswick's Video Lottery Off and Running," Play Meter, Feb. 1991, p. 15.
Record Display from the Software Patent Institute Database of Software Technologies, http://m.spi.org, Record 1 of Serial No. TDB0296.0079, dated Feb. 6, 2002, pp. 1-3.
Rosen, Richard, "Video Gambling? You Bet You Can!" Daily News, Aug. 4, 1980.
Roulabette Booklet, 1979, pp. 1-42.
"Single Room, Private Bath—and Blackjack," The New York Times, Business and Finance Section, Aug. 21, 1980.
Stockel, Anna "Securing Data and Financial Transactions," Identix Incorporated, Sunnyvale, California, 1995, pp. 397-401.
Tannenbaum, Jeffrey A., "New Way to Play: Gambling on Credit In Your Own Room," The Wall Street Journal, Jul. 31, 1980.
Dedendant's Supplemental Response to Plaintiffs' First Set of Interrogatories dated Dec. 2002 and filed in connection with *International Game Technology* v. *Aristocrat Leisure Limited*, Civil Action No. CV-S-01-1498, pp. 1-49 and 85-86.

* cited by examiner

METHOD AND APPARATUS FOR VOUCHER SORTING AND RECONCILIATION IN SOFT COUNT PROCESS

FIELD OF THE INVENTION

The present invention relates to sorting methods and apparatus.

BACKGROUND OF THE INVENTION

Many gambling machines are arranged to accept monies in the form of paper bills. The accepted money is credited to a player for betting or wagering during play of the game. In general, the gambling machine includes a bill acceptor which accepts paper or bill-type money. This bill acceptor includes a bill validator mechanism arranged to validate each bill to ensure that it is authentic. If the bill is not deemed authentic, it is rejected.

Many gambling machines are arranged to accept paper monies in a wide variety of denominations. For example, the machine may be arranged to accept $5, $10 and $20 dollar bills. In such event, the bill validator is arranged to determine the denomination of the bill.

The bill acceptor also includes a cash box. Regardless of the denomination of the accepted bill, the bill acceptor is arranged to deliver each accepted bill to the cash box. Because of the desire to reduce the complexity and size of each gaming machine, a single cash box is utilized. Thus, even when a machine is arranged to accept bills of differing denominations, all of the bills are delivered to one cash box.

The cash box is a secure repository for the accepted bill monies. At certain intervals, personnel remove the full or partially-full cash box from the gambling machine. An empty cash box is installed in replacement.

The removed cash box containing money is taken to a secure count room. The cash box is opened and the currency is removed and delivered to a bill sorter. The bill sorter is a specially configured machine for accepting bills, validating and sorting them, and calculating the total value of the bills sorted. The bill sorter sorts the bills from a provided cash box by denomination, and provides a record of the bills which were sorted and their total value. This process is generally referred to in the industry as a "soft count" process.

A gaming operator may compare the output of the bill sorter to a transaction record of the gaming machine from which the cash box was removed. The transaction record at the gaming machine provides information regarding the value of the bills received by the machine during the time period a particular cash box was installed. The value of the bills accepted by the gaming machine should be identical to the value of the bills sorted by the bill sorter in the soft count process. If there is a discrepancy, there is an indication that there may have been a breach in the security of the monies from the time they were received until they were counted, or that there is a malfunction or other problem associated with the gaming machine or count process which is resulting in errors.

In accordance with the present invention, a gaming machine is arranged to accept not only monetary bills, but vouchers. A method and apparatus is disclosed for using vouchers in a gaming system including at least one gaming machine. Also disclosed are method and apparatus for sorting and accounting for the vouchers utilized in the gaming system in order to ensure the integrity of the system.

SUMMARY OF THE INVENTION

The present invention comprises one or more methods and apparatus for sorting and reconciling vouchers accepted by a gaming machine.

In one embodiment, at least one gaming machine of a gaming system is arranged to accept both bill monies and vouchers. Each voucher includes identification information, such as a registration number. Each voucher also represents a particular value or monetary amount. The gaming machine is arranged to provide credit in the amount associated with each accepted bill or voucher. Both bill monies and vouchers are stored in a cash box or other safe repository associated with the gaming machine. The gaming machine is configured to generate information relating to each accepted voucher, or to provide such information to a remote location.

At least one apparatus is adapted to sort bill monies from vouchers retrieved from the cash box of a gaming machine. The same or another apparatus is adapted to read each voucher to determine its identity and value. At least one device, such as a computing device including hardware and/or software, is configured to determine if the value and identity of the processed vouchers reconcile with the value and identity of the vouchers having been identified as paid by the gaming machine. In this manner, a "soft count" process is performed on a group of intermingled bill monies and vouchers retrieved from a gaming machine.

In one embodiment, at least one apparatus adapted to sort and scan comprises a sorting machine arranged to sort and validate bill monies, and further configured to direct vouchers to a reject bin of the sorting machine. The scanning apparatus may be incorporated into the machine or comprise a separate apparatus, such as a hand-held laser-beam scanner or an automated scanning machine.

One or more embodiments of the invention comprise a method of utilizing a voucher in a gaming system. In one embodiment, the method includes the step of issuing at least one voucher having a particular value associated therewith. Next, the voucher is accepted at a gaming machine and the value thereof is credited to a player of the machine. A record regarding at least one accepted voucher is generated. The accepted voucher is then stored in the gaming machine. The stored vouchers are then retrieved from the gaming machine. Information regarding retrieved vouchers is then compared to information regarding the accepted vouchers contained in the record.

Further objects, features, and advantages of the present invention over the prior art will become apparent from the detailed description of the drawings which follows, when considered with the attached figures.

DETAILED DESCRIPTION OF THE INVENTION

The invention is a method and apparatus for sorting, scanning and reconciling vouchers accepted by a gaming machine in a soft count process. In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

Figure 1:
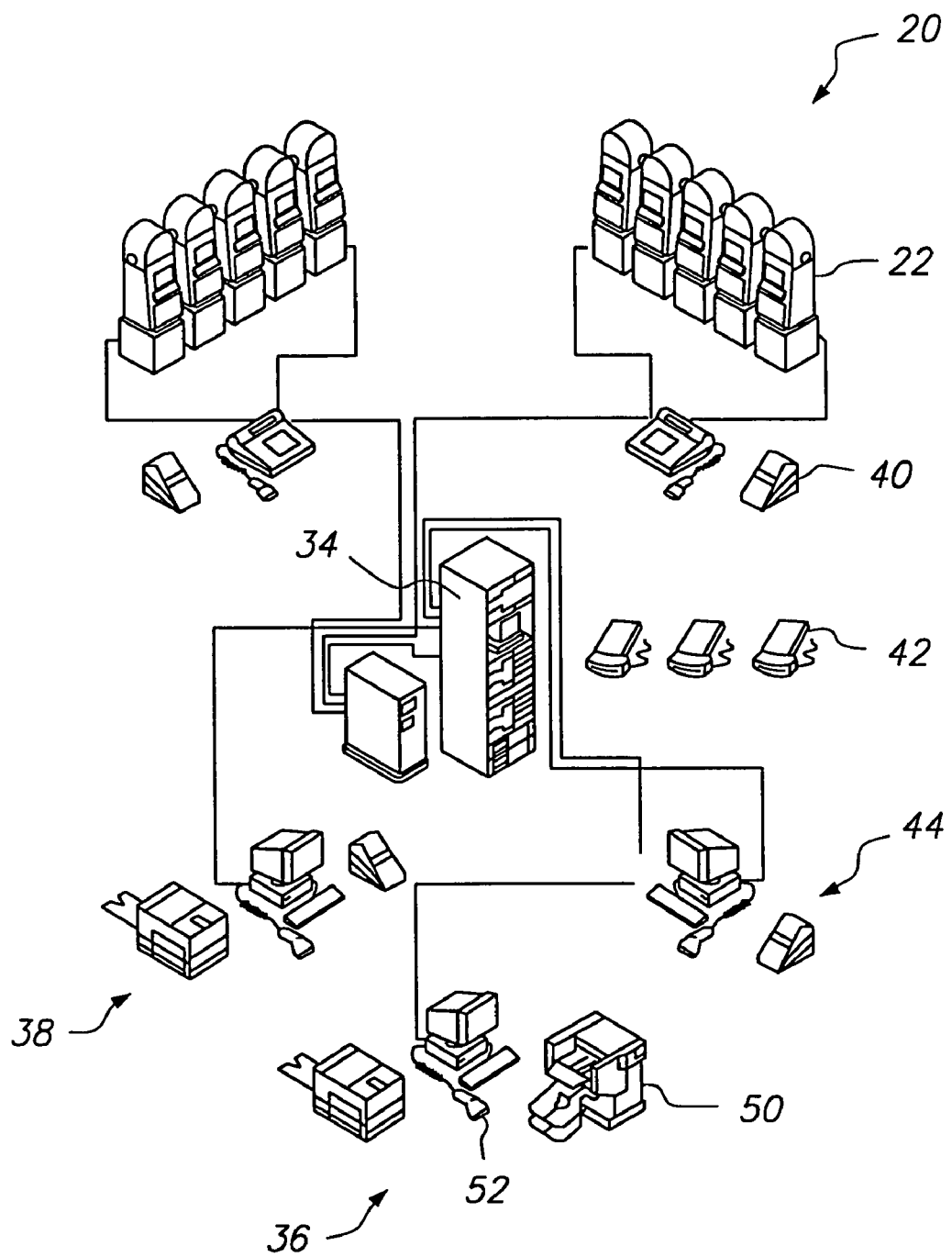
FIG. 1 illustrates a gaming system including a plurality of gaming machines adapted to accept bill monies and vouchers and including voucher sorting and reading apparatus for use in a soft count process.

FIG. 1 illustrates a system 20 including at least one gaming machine 22 which is adapted to accept vouchers 24 (see FIG. 2) and to which the present voucher sorting and reconciliation method and apparatus is applicable. The details of such a system 20 are described in U.S. patent application Ser. No. 09/544,844, filed on Apr. 7, 2000, the entirety of which is incorporated herein by reference. For convenience, many of the details of this system 20 described in the referred to application are not set forth herein, and instead only those portions of the system 20 which are necessary to understand the present invention are detailed herein.

The system 20 includes at least one gaming machine 22. As illustrated, in a preferred embodiment, the system 20 includes a plurality of such gaming machines 22. Each gaming machine 22 is arranged to present one or more games to a player. Of course, a wide variety of games now known or later developed may be presented.

In general, each gaming machine 22 is adapted to receive a wager, bet, ante or other form of credit which entitles a player to participate in a game. In one or more embodiments, each gaming machine 22 is arranged to accept such credit in the form of a voucher 24 (see FIG. 2). In a preferred embodiment, each gaming machine 22 is arranged to accept both bill-type monies 25 (see FIG. 3) and vouchers 24. By bill-type monies it is meant paper money such as that issued by the U.S. Treasury in $1, $5, $10, $20 and other denominations.

Figure 2:
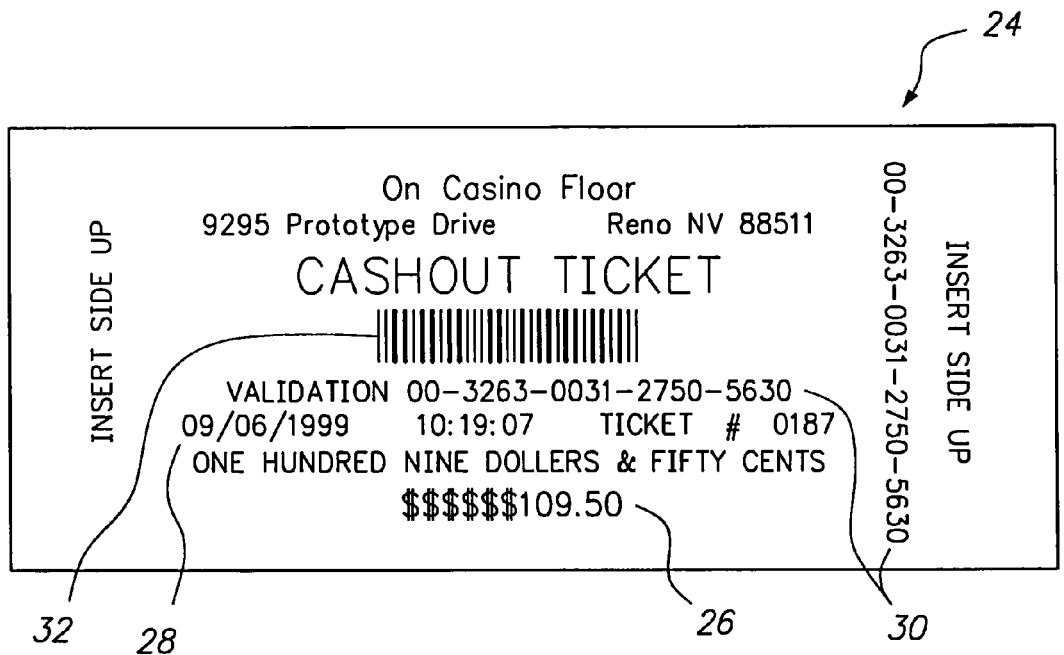
FIG. 2 illustrates a voucher in accordance with an embodiment of the invention.

A voucher 24 of the type which may be accepted by a gaming machine 22 and thus needs to be sorted and validated in accordance with the method and apparatus of the present invention is illustrated in FIG. 2. The voucher 24 comprises a ticket-type item having information associated therewith. In a preferred embodiment, information is printed on the voucher 24. In one or more embodiments, the printed information includes information which is in human-readable form, such as a dollar amount 26 identifying the represented value of the voucher 24, a time 28 at which the voucher 24 was issued, a voucher validation code 30 or other unique identifier, and a variety of other information as desired, such as information regarding the gaming machine which issues the voucher 24.

In one or more embodiments, the information associated with the voucher 24 includes machine readable information. As illustrated, this information comprises a UPC type bar-code 32.

In one or more embodiments, the bar-code 32 may represent encoded information such as the value of the voucher 24 and other information. In a preferred embodiment, the bar code 32 represents the validation code or other unique identifier 30. Information such as the value of the voucher 24 is obtainable utilizing the validation code or number 30, this information capable of being located or stored remote from the voucher 24 itself, as described in detail below.

Those of skill in the art will appreciate that the vouchers 24 may take a variety of forms. For example, the vouchers 24 may be constructed of paper, plastic or other material. The information which is associated with the voucher 24 need not be printed thereon. For example, the bar coding may be accomplished with different colors of material comprising the voucher 24, such as by exposing thermoplastic to high heat or the like to generate the spaced bars. The magnetic stripes or chips or similar information storage elements may be associated with the voucher 24 for use in storing the information. Information may be coded in the form of punch holes or other patterns of material or voids of material. In a preferred embodiment, each voucher 24 has a size which is approximately the same as that of a the bill monies 25 which the gaming machine 22 is adapted to accept.

As is well known in the art, when a player provides the necessary credit to the gaming machine 22, the player is permitted to play a game presented by the machine. A player may be permitted to place a variety of different bets utilizing the provided credit. In the event the player is declared a winner of the game, the player is paid an award. The award may be in the form of coins, vouchers 24 or other items of value or elements which may be redeemed for value.

Referring again to FIG. 1, in accordance with the system 20 of the invention, one or more gaming machines 22 capable of issuing and accepting the vouchers 24 are associated with a central host 34. One or more appropriate communications links, whether wired or wireless, permit information to be transferred to and from each gaming machine 22 and the central host 34. The central host 34 may comprise a single computer or a group of computers associated with one another on a network.

In one embodiment, the central host 34 includes at least one data storage element for storing information regarding issued vouchers 24. The data storage element may comprise a hard drive, RAM, ROM, tape drive, CD or other members or elements. The central host 34 also includes necessary communications equipment, such as network cards or the like for receiving and sending information.

As described in more detail below, a soft count system 36 is associated with the gaming system 20, including the host 34. The soft count system 36 is arranged to sort vouchers 24 which have been accepted by the gaming machines 22 and perform a variety of other functions, including verifying authenticity of the vouchers 24 and reconciling the vouchers 24 against those which have been recorded as having been received and paid (i.e. credited) by the particular gaming machine 22.

A variety of other elements may be associated with the system 20. For example, an audit system 38 may be associated with the gaming system 20. The audit system 38 may be used to poll the host 34 and confirm the proper operation of the system 20. The audit system 38 may also be used by controllers of the system 20 to change operational parameters of the system 20.

One or more clerk validation mechanisms 40, wireless cashier terminals 42 and cashier cage systems 44 may be associated with the gaming system 20. The manner by which information from these mechanisms, terminals and systems is transmitted to and from other mechanisms, terminals and systems may vary, as known in the art. For example, as illustrated, the wireless cashier terminals 42 transmit and receive information from the central host 34 via a wireless communications link. The other systems, including the soft count system 36, clerk validation mechanisms 40 and cashier cage systems 44 are illustrated as being hard wired to the central host 34.

The clerk validation mechanisms 40, wireless cashier terminals 42 and cashier cage systems 44 may be arranged to include a variety of apparatus, including both hardware and software, for performing a variety of functions. In one or more embodiments, these mechanisms 40, terminals 42 and systems 44 may include voucher 24 issuing or printing devices, voucher scanning or reading devices and receipt printing devices. In this manner gaming personnel may issue vouchers 24 to players and players may cash-in vouchers 24 after play at a variety of locations.

A player may obtain a voucher 24 in several ways. As described in more detail below, in the event the player is the winner of a game played on one of the gaming machines 22, the player may be issued the voucher 24 representing the award for that win or a number of wins. In one or more embodiments, a player is permitted to receive the voucher 24 instead of a coin or other type of payout when the player elects to "cash-out" and stop playing the gaming machine. When a player elects to cash-out, all credits belonging to the player are paid. These credits include any remaining credit paid by the player to the gaming machine 22 and any winnings for games already played, less any amounts bet.

A player may also obtain a voucher 24 at a cashier cage or other location. For example, a player may utilize a credit card or cash to establish credit/payment with the game operator. Once the game operator is satisfied of the payment, the operator may issue a voucher 24 to the player for use by the player at any of the gamine machines 22.

Appropriate mechanisms are associated with the gaming machine 22 or other systems, such as the cashier cage system 44, for printing and issuing the voucher 24, such as that described above. In general, when a gaming machine 22 issues the voucher 24, the central host 34 is polled and provides the gaming machine 22 with the appropriate information for printing the voucher 24. Such information may include the voucher validation number 30. At the same time, the gaming machine 22 provides information to the central host 34 regarding the value of the voucher 24 which is to be issued. The gaming machine 22 then dispenses the printed voucher 24 to the player.

A player having a voucher 24 may travel to any gaming machine 22 which is arranged to accept vouchers 24 and utilize the voucher 24 to provide the necessary credit to entitle the player to play the game. In one or more embodiments, the player is not limited to presenting the voucher 24 to the same gaming machine 22 which issued it, but may present it to any gaming machine 22 associated with the system 20.

Figure 3:
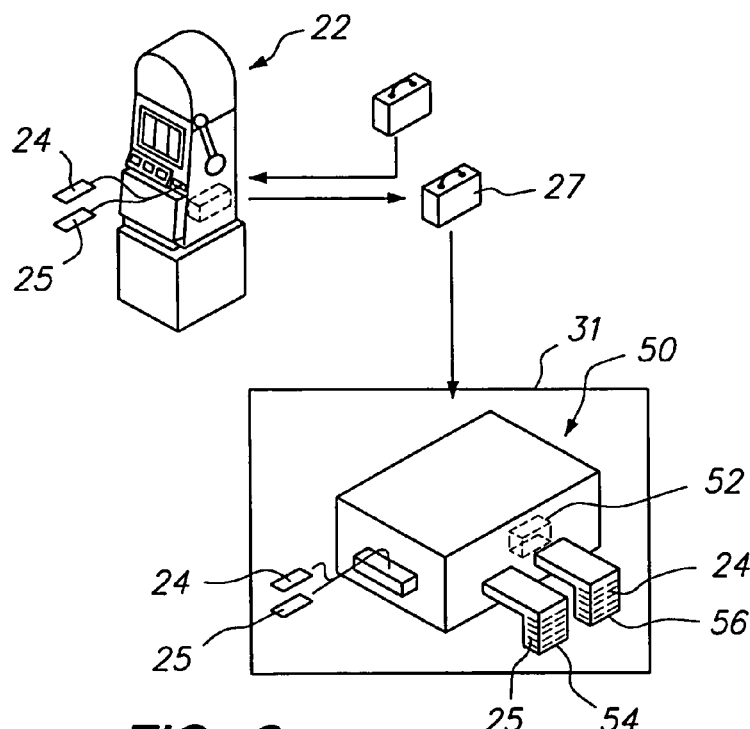
FIG. 3 illustrates a sequential flow of bills and vouchers from a player to a gaming machine, then to a cash box, then to a count room, and then to apparatus in accordance with the invention for sorting, scanning and reconciling the bills and vouchers.

Referring to FIG. 3, though not illustrated in detail, each gaming machine 22 includes a validating mechanism and a storage device for the bill monies 25 and vouchers 24. The validating mechanism is arranged to verify the authenticity of the bill money 25 or voucher 24 which is supplied by the player, thus establishing the right of the player to play the game. For example, the validating mechanism is arranged to reject a counterfeit paper item which a player attempts to pass as a treasury bill. The operation of these mechanisms are well known.

In accordance with the invention, the validating mechanism is also arranged to verify the authenticity of the voucher 24 which is supplied by a player. In an embodiment where the voucher 24 is arranged as illustrated in FIG. 2, the validating mechanism may read the bar code 32 and send the validation code 30 or other identifying information for that voucher 24 represented by the bar code 32 to the central host 34. The central host 34 may then confirm whether the voucher 24 is valid and the value which it represents.

If the central host 34 indicates that the voucher 24 is valid, then the gaming machine 22 is arranged to credit the player the value of that voucher 24. Further, a transaction record associated with the gaming machine 22 is updated, which record makes it possible to determine the total value of all bill monies 25 and vouchers 24 accepted by that particular gaming machine.

When accepted, the voucher 24 itself is forwarded to a cash box 27 located within the gaming machine 22. Such cash boxes 27 are well known and as such will not be described in detail herein. In general, the cash box 27 comprises a secure container for the bill monies 25 and vouchers 24 accepted by the gaming machine 22.

Importantly, all bill monies 25 and vouchers 24 accepted by the gaming machine 22 are stored in a single cash box 27. The bills 25 and vouchers 24 are generally stacked vertically upon one another in the cash box 27 in their order of acceptance.

At some point in time, the cash box 27 will be or must be removed from the gaming machine 22. For example, a full cash box 27 must be removed from a gaming machine 22 and replaced with an empty one in order for the gaming machine 22 to remain operational. The cash box 27 may also be removed from a gaming machine 22 when the gaming machine 22 is to be moved or other security issues arise, whether or not the cash box 27 therein is full at that time.

Eventually, the monies and vouchers 24 received by the gaming machine 22 are removed and must be counted, such monies and vouchers represent receivables of the gaming operation. This process is referred to herein as the "soft count" process. This process preferably takes place in a secure room 31 of a gaming establishment.

It is necessary to ensure that the monies and vouchers 24 which are retreived from the cash box 27 of the particular gaming machine 22 reconcile with the value of the bill monies 25 and vouchers 24 which the gaming machine 22 indicates that it received and credited value to a player for. If these values do not reconcile, a breach in the system is indicated which must be investigated. Such breaches may comprise the theft of monies from the cash box 27 after the monies 25 and vouchers 24 have been accepted by the machine, or tampering with the gaming machine 22 or a wide variety of other factors.

In accordance with the present invention, there is provided a method for soft counting vouchers 24 and bill monies 25, and reconciling the values of these items, specifically including the vouchers 24. One or more embodiments of the invention comprise apparatus for accomplishing the method.

Referring to FIG. 1, in one embodiment, the apparatus includes at least one voucher 24 processing device 50 which is associated with the soft count system 36. The processing device 50 includes a sorting mechanism for sorting bills 25 from vouchers 24, and a scanning device or mechanism arranged to read information printed on each voucher 24, such as the bar code 32.

Referring to FIG. 3, in one or more embodiments, the processing device 50 of the invention comprises a basic currency discriminator (i.e. machine arranged to discriminate bill monies), such as the model GFR-110 currency discriminator offered by Glory (U.S.A.), Inc. of Caldwell, N.J., which has been modified to sort bills 25 and vouchers 24, and validate bills 25 and scan vouchers 24. In such an arrangement, the processing device 50 includes a sorting mechanism for sorting bills 25 into a first bin 54, tray or the like, and the vouchers 24 into a second bin 56, tray or the like. In addition, the processing device 50 is arranged to include a high speed scanner 52, such as a laser-beam type scanner. As described above, in one particular embodiment, a currency discriminator such as that identified above is modified to include such a scanner 52.

In another embodiment, the vouchers 24 are sorted into the reject bin of a bill sorting and validating mechanism, such as the above-referred currency discriminator. Thereafter, the vouchers 24 may be scanned by hand or with a separate high speed automated scanner, such as model NB-510 bar coded document reader offered by Duplo, U.S.A. located in Santa Ana, Calif. Such a scanner is capable of scanning up to 300 items per minute.

In one embodiment, the scanner 52 comprises a hand-held scanner 52 or similar mechanism utilized to read the information printed on the vouchers 24. As stated above, in such an arrangement, a first sorting apparatus may be employed for separating the vouchers 24 from the bills 25, and then the hand-held scanner 52 is used to read the information on each voucher 24.

As used herein, the term "scanner" is intended to mean any apparatus, device or the like which is capable of determining some or all of the information associated with the voucher 24. In the preferred embodiment, the scanner comprises a laser-beam scanning device which is capable of reading a bar code. It will be appreciated that the scanner may comprise a wide variety of other devices depending upon the manner in which information is associated with the voucher 24. For example, a magnetic stripe reader may be utilized as the scanning apparatus when information is associated with a magnetic stripe of the voucher 24.

In a preferred embodiment, the scanning apparatus comprises a high-speed scanning device which is capable of feeding vouchers 24 through a scanning device at a high rate of speed. As described above, the scanning apparatus may comprise a high-speed sorting device including a scanning device, or simply comprise a stand-alone scanning device.

Figure 4:
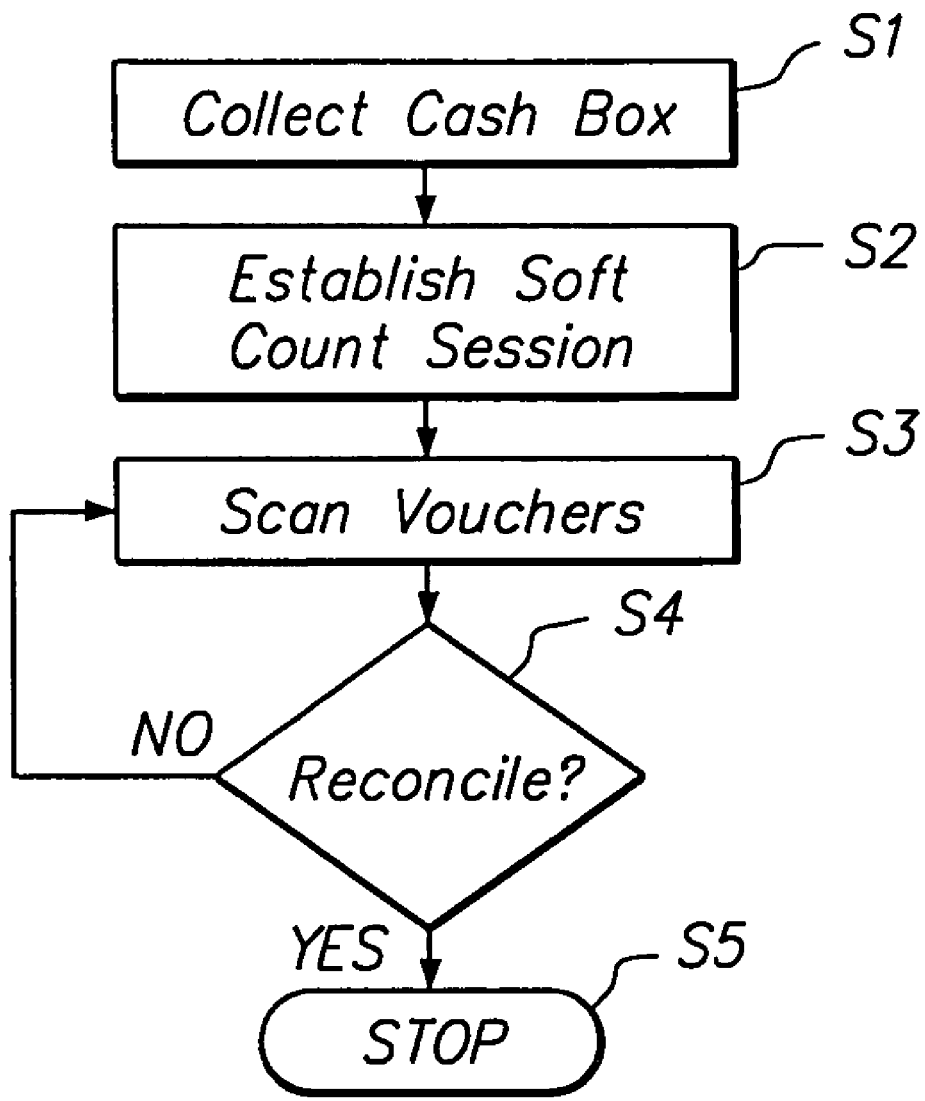
FIG. 4 is a flowchart illustrating a method of sorting and reconciling vouchers accepted by a gaming machine in accordance with the present invention.

An embodiment of a soft count method or process in accordance with the invention will be described with reference to FIG. 4. In a first step S1, the cash box 27 from a particular gaming machine 22 or more than one gaming machine is collected. As stated above, this step generally comprises the removal of the cash box 27 containing one or more bills 25 or vouchers 24 and replacing the cash box with an empty cash box. Generally, only certain personnel are permitted access to the cash box 27 in a gaming machine 22, the cash box being secured in a locked portion of the machine.

In a second step S2, a soft count session is established. In a computerized system, this step may comprise clearing information from a previous days' soft count session and initiating or opening new files for the storage of data associated with the new soft count process. The new data may include the date of the session.

In a step S3, each voucher 24 is scanned. As described above, the vouchers 24 may be separated from the bills 25 in a sorting step before each voucher 24 is scanned. In another embodiment, the vouchers 24 and bills 25 may be run through a scanner, since only the vouchers 24 are readable. As part of this step, each voucher 24 is preferably identified as having been scanned and accounted for. For example, the scanner may send information to the central host 34 regarding the validation code 30 and value of the voucher 24. In response to this information, the central host 34 may verify the existence of that voucher 24 and its value. In addition, the central host 34 may associate information with the data/file regarding that voucher to identify that voucher 24 as having been scanned or counted.

Step S4 comprises a reconciliation step. In this step, the sums of the values of all of the scanned vouchers 24 are compared to the known values of the vouchers 24 as paid by the gaming machines 22. In addition, the specific identities of those vouchers 24 which were paid by the gaming machines 22 may be compared to the identities of those vouchers 24 which were processed in the soft count process. In one embodiment, the values of all bills 25 and vouchers 24 are combined or associated during this reconciliation step. As used herein, the terms reconcile/reconciled/reconciliation have the general meaning of comparing, matching or determining a corresponding in identity. For example, as used herein in one embodiment, the terms mean determining if a first value of each or all vouchers 24 accepted and paid by the gaming machine 22 is the same as second value of each and/or all of the vouchers 24 during the soft count process. The terms as used herein also include determining a correspondence in voucher 24 identity, such as in registration number 30. As stated above, a variety of apparatus and method are contemplated for accomplishing the reconciliation. In one or more embodiments, the reconciliation is accomplished with a computing device or apparatus which is adapted to compare a first value of the vouchers 24 (such as provided by the gaming machine 22) with a second value of the vouchers 24 (as provided by the soft count system 36).

If in step S4 a reconciliation exists, then the process may be stopped in a step S5. Another process may then be initiated. If in step S5 a reconciliation does not exist, then the process may be reinitiated. In a preferred embodiment, information regarding the count process is cleared and the vouchers 24 are rescanned, continuing again at step S3. If during the reconciliation step it is determined that the identity of the vouchers 24 has changed from that as paid, then this information is useful in determining a breach in the security of the system 20 or an internal problem with the operation of the system.

If after several attempts errors remain in the soft count process, further investigation may be conducted to determine the source of the error. Such errors may result from the theft of one or more vouchers 24 from the gaming machines 22, the attempted replacement of vouchers or a wide variety of other problems, including mechanical error.

A wide variety of other embodiments of the invention are contemplated. In one or more embodiments, during the soft count process one or more of the vouchers 24 may be scanned manually. For example, a voucher 24 may become damaged in a manner which prevents it from being passed through the automated scanner 50 or a sorter. In such event, the voucher 24 may be scanned with a hand-held scanner or the voucher registration number 30 may be manually input, such as through a keyboard. In an alternative scenario, the bar code 32 information on the voucher 24 may be unreadable, although the voucher 24 may be capable of being run through the sorter and/or automated scanner. In such event, the voucher registration number 30 may be input manually, such as through a keyboard.

In one or more embodiments, it may be desirable to generate a physical record of each voucher 24 which is processed in the soft count process. During the soft count process, a digital image of each voucher 24 may be generated, such as with a digital camera. This image may be stored at the central host 34 with the information thereon used to identify the voucher 24 and reconcile it.

It will be appreciated that a variety of information may be read from each voucher 24 and stored or reconciled. In addition, one or more reports may be available, such reports providing information regarding the soft count process such as the number of vouchers 24 sorted, their dates of issuance and the like. The variety of information transferred, stored and the manner of transfer and storage and manipulation may vary as desired.

The particular apparatus which is used to read the vouchers 24 may vary dependent upon the form of the voucher 24. For example, if the voucher 24 has associated information stored on a magnetic stripe associated therewith, then appropriate magnetic stripe-reading apparatus is preferably associated with the soft count system 36. Thus, by the term "scan" as used herein, it is meant that the information is obtained from the voucher 24. As stated, the particular means by which this information is obtained may vary dependent upon the form of the voucher 24.

The present invention has a number of significant advantages. In accordance with the invention, a gaming system 20 is arranged to permit use of both bill monies 25 and vouchers 24 in accepting credit for play of games and for payment of value. More importantly, the vouchers 24 and bill monies 25 are conveniently processed by the same mechanisms by a gaming machine 22. Both the bills 25 and vouchers 24 are stored in the common cash box 27 or other secure area. In this manner, a gaming machine 22 need not be significantly altered to accept and pay vouchers 24. The cash boxes 27 need not be altered at all, but instead may comprise the cash boxes 27 currently used to store bill monies 25.

In accordance with the invention, the vouchers 24 are conveniently accounted for in a soft count process. The vouchers 24 are intermingled with bill monies 25 in the cash box 27 and are conveniently scanned and reconciled with the monies in a single process. In the process, the vouchers 24 are separated from the bill monies 25 in automated fashion, saving time and expense. The bill monies 25 can then be reconciled and forwarded to a vault, bank or other location. The vouchers 24 are then scanned or otherwise processed for reconciliation, and then may be stored, destroyed or otherwise disposed of.

Information provided during this process is utilized to validate the vouchers 24 and, more generally to reconcile accepted vouchers and payments made by particular gaming machines 22. In this manner, the integrity of the gaming system 20 is checked and maintained.

It will be understood that the above described arrangements of apparatus and the method therefrom are merely illustrative of applications of the principles of this invention and many other embodiments and modifications may be made without departing from the spirit and scope of the invention as defined in the claims.

I claim:

1. A method, implemented on a gaming system including at least one gaming machine, of utilizing a voucher in the gaming system comprising the steps of:
    issuing at least one cash voucher having a particular cash value associated therewith;
    accepting by said at least one gaming machine said at least one cash voucher;
    crediting said particular cash value to a player of said at least one gaming machine;
    generating a record regarding said at least one accepted cash voucher;
    storing said at least one cash voucher in said at least one gaming machine;
    retrieving one or more cash vouchers from said at least one gaming machine; and
    comparing information from said one or more retrieved cash vouchers to information regarding said at least one accepted cash voucher contained in said record.

2. The method in accordance with claim 1 wherein said at least one gag machine is arranged to accept bill monies, and further including the steps of:
    accepting by said at least one gaming machine at least one bill money; and
    crediting the value of said at least one bill money to a player of said at least one gaming machine.

3. The method in accordance with claim 2, further including the steps of:
    retrieving said at least one bill money and said at least one cash voucher from said at least one gaming machine; and
    sorting said at least one cash voucher from said at least one bill money.

4. The method in accordance with claim 1, further including the step of:
    reading information from said at least one cash voucher after said at least one cash voucher is retrieved from said at least one gaming machine.

5. The method in accordance with claim 4 wherein said step of reading comprises scanning a bar code associated with said cash voucher.

6. The method in accordance with claim 1 wherein multiple cash vouchers are accepted by said at least one gaining machine and said step of comparing comprises comparing the values of all cash vouchers accepted by said at least one gaming machine to the values of the cash vouchers retrieved from the machine.

7. The method in accordance with claim 1 wherein each of said at least one accepted cash voucher and each of said one or more retrieved cash vouchers has a unique identifying element and said comparing step comprises comparing said identifying element of each retrieved cash voucher against identification information stored in said record of said at least one accepted cash voucher.

8. The method in accordance with claim 1, further including the step of:
    reconciling said at least one accepted cash voucher with said one or more retrieved cash vouchers.

9. In a gaming system including at least one gaming machine arranged to accept both bill monies and cash vouchers and store accepted bill monies and cash vouchers with one another, a soft count system for reconciling cash vouchers accepted by said at least one gaming machine with cash vouchers retrieved by said at least one gag machine comprising:
    at least one data storage element for storing data regarding accepted cash vouchers, including a value of said accepted cash vouchers;
    a sorting mechanism arranged to sort bill monies and cash vouchers retrieved from said at least one gaming machine; and
    a scanner for reading information associated with said cash vouchers.

10. The gaming system in accordance with claim 9 wherein said sorting mechanism includes a high speed scanner.

11. The gaming system in accordance with claim 9 wherein said sorting mechanism includes a bill sorter and a reject area and said sorting mechanism is arranged to sort said cash vouchers into said reject area.

12. The gaming system in accordance with claim 9 wherein said soft count system includes means for generating an image of at least one of said cash vouchers.

13. The gaming system in accordance with claim 9 wherein said soft count system includes at least one hand-held scanner.

14. A method, implemented on a gaming system including at least one gaming machine, of reconciling cash vouchers and bill monies accepted by the gaming machine comprising:
    crediting automatically on said gaming machine a value associated with a cash voucher or bill money accepted by said gaming machine;
    retrieving intermingled cash vouchers and bill monies which have been credited;
    sorting said cash vouchers from said bill monies; and determining if a total value of said retrieved cash vouchers and bill monies comprises the total value credited for said accepted cash vouchers and bill monies.

15. The method in accordance with claim 14, further including:
   storing said cash vouchers and bill monies after said crediting.

16. The method in accordance with claim 14, further including the step of:
   scanning said cash vouchers to obtain value information associated with each cash voucher.

17. A system including at least one gaming machine in which a user is permitted to make payment in the form of bill monies or cash vouchers comprising:
   at least one container for storing accepted bill monies and cash vouchers with one another;
   at least one apparatus adapted to sort said cash vouchers from said bill monies retrieved from said at least one container;
   at least one apparatus adapted to scan said cash vouchers to obtain value and identification information regarding each cash voucher, and
   a computing device adapted to determine whether the value of said sorted and scanned cash vouchers is the same as the value of cash vouchers accepted to said container.

18. The system in accordance with claim 17 wherein a single apparatus is adapted to sort said cash vouchers and bill monies and scan said cash vouchers.

19. The system in accordance with claim 17, wherein said gaming machine is arranged to accept bill monies and cash vouchers and store said bill monies and cash vouchers in said at least one container.

20. The system in accordance with claim 17 wherein at least one of said cash vouchers has a bar code printed thereon and said value and identification information for said at least one of said cash vouchers is associated with said bar code.

21. The system in accordance with claim 20 wherein said at least one apparatus adapted to scan comprises a laser-beam scanner for reading said bar code.

22. The system in accordance with claim 17 wherein said computing device comprises a computer having information stored regarding the value of said accepted cash vouchers.

23. A method of using tangible vouchers in a gaming system, comprising:
   issuing a first tangible voucher having a first particular cash value associated therewith and a first bar code displayed thereupon, said first bar code including at least a first validation code for said first tangible voucher;
   creating a first host record of said issuance of said first tangible voucher at a central host location, said first host record including said first validation code;
   starting a time period for a gaming machine in said gaming system, said gang machine being adapted to accept wagers, play games based on said wagers, and grant monetary awards based on the results of said games;
   accepting said first tangible voucher by said gaming machine;
   reading said first bar code of said first tangible voucher with an automated validating mechanism at said gaming machine;
   determining said first validation code from said reading of said first bar code at said gaming machine;
   sending said first validation code from said gaming machine to said central host, said central host being located at a remote location from said gaming machine;
   comparing said first validation code sent from said machine with said first validation code stored in said first host record at said central host;
   validating said first tangible voucher within said gaming machine as a result of a match between said first validation codes;
   crediting said first particular cash value to a credit meter at said gang machine;
   generating a first acceptance record regarding the acceptance and validation of said first tangible voucher at said gaming machine;
   permitting a monetary wager to be made at said gaming machine with credit from said first particular cash value credited to said credit meter;
   playing a game based on said monetary wager at said gaming machine;
   granting a monetary award based on an outcome of said game;
   storing said first tangible voucher in a storage box within said gaming machine;
   accepting a bill money by said gaming machine;
   crediting the cash value of said bill money to said credit meter;
   generating a bill acceptance record regarding the acceptance of said bill money at said gaming machine;
   storing said bill money in said storage box along with said first tangible voucher;
   issuing a second tangible voucher having a second particular cash value associated therewith and a second bar code displayed thereupon, said second bar code including at least a second validation code for said second tangible voucher;
   creating a second host record of said issuance of said second tangible voucher at said central host location, said second host record including said second validation code;
   accepting said second tangible voucher by said gaming machine;
   reading said second bar code of said second tangible voucher with said automated validating mechanism at said gaming machine;
   determining said second validation code from said reading of said second bar code at said gaming machine;
   sending said second validation code from said gaming machine to said central host;
   comparing said second validation code sent from said gang machine with said second validation code stored in said second host record at said central host;
   validating said second tangible voucher within said gaming machine as a result of a match between said second validation codes;
   crediting said second particular cash value to said credit meter;
   generating a second acceptance record regarding the acceptance and validation of said second tangible voucher at said gaming machine;
   storing said second tangible voucher in said storage box in intermingled fashion with said bill money and said first tangible voucher;
   ending said time period for said gaming machine;
   retrieving all tangible vouchers and bill monies from said storage box, including said first tangible voucher, said second tangible voucher and said bill money;
   sorting said first tangible voucher and second tangible voucher from said bill money;

comparing information from said first bar code on said first tangible voucher to said first acceptance record;

comparing information from said bill money to said bill acceptance record;

comparing information from said second bar code on said second tangible voucher to said second acceptance record; and comparing a total value of all retrieved tangible vouchers and bill monies to a total value of all tangible vouchers and bill monies credited at said machine during said time period.

24. The method in accordance with claim 23, wherein said first tangible voucher comprises a printed ticket.

* * * * *